United States Patent [19]

Sexton

[11] Patent Number: 5,018,146
[45] Date of Patent: May 21, 1991

[54] APPARATUS AND METHOD FOR DETERMINING IF A PARTICULAR PLUG-IN CARD IS APPROPRIATE FOR USE WITH AN ELECTRONIC PROCESSOR

[75] Inventor: Daniel W. Sexton, Charlottesville, Va.

[73] Assignee: GE Fanuc Automatinon North America, Inc., Charlottesville, Va.

[21] Appl. No.: 369,898

[22] Filed: Jun. 22, 1989

[51] Int. Cl.⁵ .............................. G06F 11/10
[52] U.S. Cl. ...................... 371/37.1; 235/437
[58] Field of Search ............... 371/37.1, 37.6, 40.4, 371/40.1, 53, 54, 57.1; 235/437, 382; 340/825.31, 825.32; 364/200 MS File, 900 MS File

[56] References Cited

U.S. PATENT DOCUMENTS

| | | | |
|---|---|---|---|
| 4,523,314 | 6/1985 | Burns | 371/40.1 |
| 4,684,791 | 8/1987 | Bito | 235/382 X |
| 4,709,367 | 11/1987 | Grafe | 371/40.1 |
| 4,720,831 | 1/1988 | Joshi | 371/37.1 |
| 4,907,231 | 3/1990 | Watanabe | 371/40.1 X |
| 4,930,129 | 5/1990 | Takahira | 371/37.1 X |

OTHER PUBLICATIONS

W. Peterson, "Error-Correcting Codes", 2nd Ed., MIT Press, 1972, pp. 209 and 225.

Primary Examiner—Jerry Smith
Assistant Examiner—Robert W. Beausoliel
Attorney, Agent, or Firm—James H. Beusse

[57] ABSTRACT

An electronic processor based system is provided which is capable of receiving plug-in cards. The plug-in card includes a memory which contains a first error check word which is a function of seed data words which are also stored in that memory. The first error check word is related to the seed data words by a predetermined algorithm. When the card is inserted in the processor system, the system reads the first error check word and the seed data words stored in the memory on the card. In one form, the processor system then performs its own independent calculation of a second error check word by using the same predetermined algorithm to operate on the seed data words retrieved from the card. The processor system compares the second error check word with the retrieved first error check word. If the second error check word is found to be the same as the retrieved first error check word, then the card is permitted to continue operation together with the system. However, if the second error check word is not found to be the same as the retreived first error check work, then the card is not permitted to continue operating with the system.

9 Claims, 1 Drawing Sheet

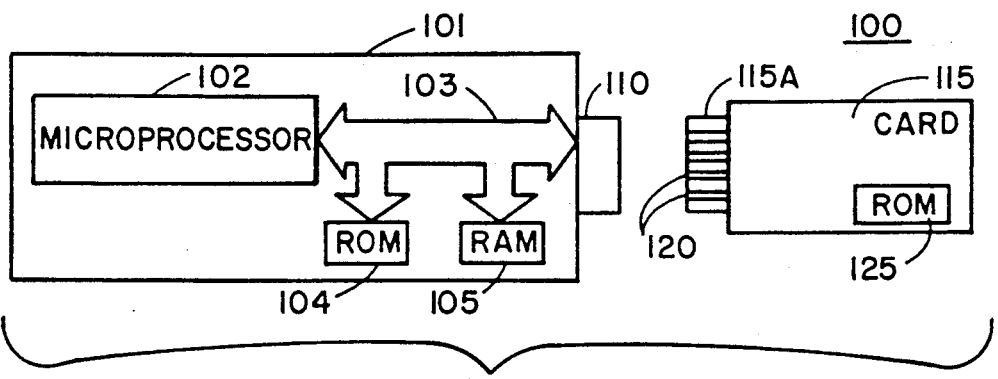
FIG. 1
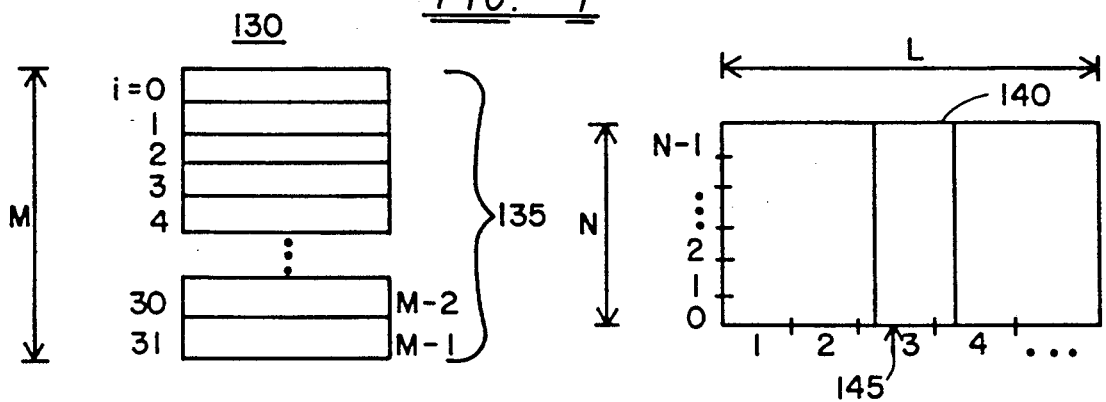
FIG. 2A
FIG. 2B
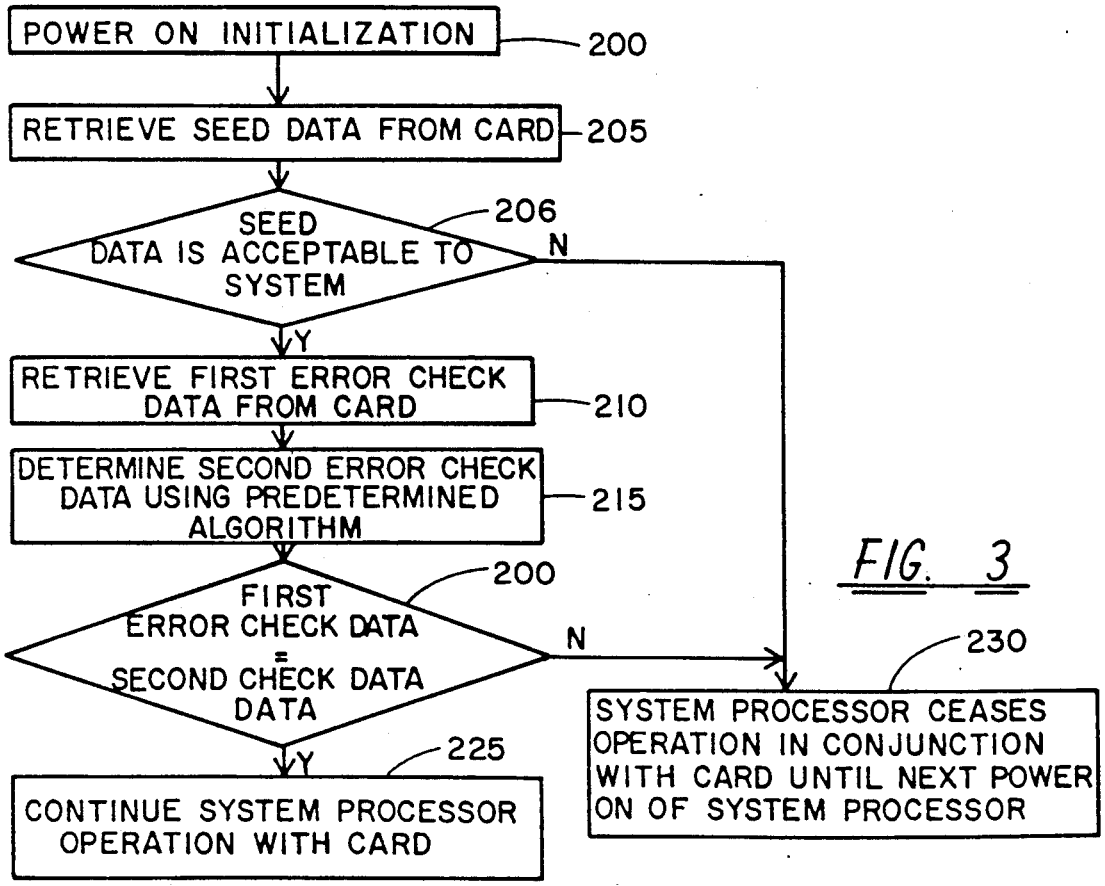
FIG. 3

APPARATUS AND METHOD FOR DETERMINING IF A PARTICULAR PLUG-IN CARD IS APPROPRIATE FOR USE WITH AN ELECTRONIC PROCESSOR

BACKGROUND OF THE INVENTION

This invention relates in general to electronic data processors such as programmable logic controllers and, more particularly, to electronic processors and controllers incorporating card slots for accepting plug-in printed circuit cards.

BRIEF SUMMARY OF THE INVENTION

Electronic data processors such as programmable logic controllers and computers are capable of accepting plug-in logic cards to enhance the operation of the processor or to replace defective cards. Typically, such plug-in cards include a multi-pin connector which may be plugged into a mating connector on the backplane of a programmable logic controller or into a mating connector which constitutes one slot on a motherboard bus. Unfortunately, with the relatively large number of different types of processors and potentially incompatible or inappropriate plug-in cards, the number of possible processor/card combinations has become so large that it is often difficult for the user to know if a particular plug-in card is appropriate for use with a given processor system. In some circumstances, damage to the processor, the plug-in card or both can result if an improper plug-in card is installed in a processor.

Accordingly, one object of the present invention is to provide an apparatus and method for determining if a particular plug-in card is appropriate for use with a particular processor.

Another object of the present invention is to reduce the incidence of damage to electronic processors when inappropriate plug-in cards are coupled to electronic processors.

In accordance with the present invention, an information processing system is provided which is capable of identifying an electronic circuit card prior to permitting operation of the electronic circuit on the card in the system. Each card to be plugged into the system has a memory for storing a first error check code and seed data. The first error check code is a function of the seed data stored on the card and is related to the seed data by a predetermined algorithm. The system further includes a microcomputer or other logic circuit capable of communicating with the card when the card is connected to the system. The microcomputer is programmed to retrieve the first error check code and the seed data from the card and to calculate a second error check code from the retrieved seed data using the predetermined algorithm. The microcomputer compares the second error check code with the retrieved first error check code. If the second error check code is identical to the retrieved first error check code, the microcomputer recognizes the card and allows the system to operate using the card. If the error check codes do not match, the microcomputer instructs the system to disregard the card.

BRIEF DESCRIPTION OF THE DRAWINGS

The features of the invention believed to be novel are specifically set forth in the appended claims. However, the invention itself, both as to its structure and method of operation, may best be understood by referring to the following description taken in conjunction with the accompanying drawings in which:

FIG. 1 is a block diagram of an electronic processor system and a plug-in card which is ready for insertion into the processor system;

FIG. 2A is a representation of a memory map for the memory on the plug-in card;

FIG. 2B is a representation of the circular file map employed in the present invention; and FIG. 3 is a flowchart of the operation of a control software program installed within memory in the processor system to implement the present invention.

DETAILED DESCRIPTION OF THE INVENTION

FIG. 1 is a block diagram of an electronic microprocessor-based information processing system 100. System 100 includes an electronic processor unit 101 such as a programmable logic controller, a microprocessor-based computer or other computer. One processor unit which may be used as processor unit 101 is the Series 90-70 programmable logic controller, manufactured by GE Fanuc Automation N.A., Inc. Those skilled in the art will appreciate, however, that the invention may be practiced in conjunction with other electronic processors as well. Processor unit 101 includes a main processor 102 such as a microprocessor, for example. Processor 102 is coupled via a bus 103 to a read only memory (ROM) 104 and a random access memory (RAM) 105. Read only memory 104 provides permanent storage for a selected operating system which controls the general operation of processor unit 101 and further provides permanent storage for a control program which controls the specific operation of processor unit 101 in accordance with the present invention.

A multi-conductor connector 110 is coupled to processor unit 101 to permit processor unit 101 plug into a backplane (not shown) of a type well known in the art for physical coupling to I/O connectors 110. Plug-in cards or printed circuit cards such as card 115 can be connected to backplane which is connected to bus 103 of processor unit 101. The backplane provides a convenient connection mechanism for interconnecting various types of plug-in cards or printed circuit boards. One end 115A of card 115 includes a plurality of conductive paths 120 for carrying electric signals from circuitry (not shown) on card 115 through backplane 108 and connector 110 to bus 103 of processor unit 101 and vice versa. Card end 115A is alternatively referred to as the mating portion 115A of card 115. That is, card mating portion 115A mates with connector 110 of the backplane. The particular type of connector 110 shown in FIG. 1 is referred to as a VME connector while connector 115A is illustrated as an edge connector.

A memory 125, such as a read only memory (ROM), for example, is situated on card 115 for storing both seed data and first error check code, as explained subsequently. Seed data typically includes such information as the part number of card 115, the serial number of card 115, the manufacturing date of card 115 and other information specific to card 115. However, seed data may also include data which is not specifically related to the characteristics of card 115.

The first error check code stored in memory 115 is a function of the seed data stored in memory 115. That is, the first error check code is related to the seed data by a selected predetermined algorithm, an example of which is given later. The first error check code is alternatively referred to as the first error check word.

In one embodiment of the invention, memory 125 is laid out as shown in the memory map of FIG. 2A which depicts a memory segment or array 135. Memory 125 is shown as including M=32 locations wherein each location is N=8 bits wide and exhibits its own unique address. In other words, each of these locations is capable of containing an 8 bit data word. A memory pointer 130 is defined to track the addresses of these M memory locations from i=0, i=1 to i=M−1 as shown in FIG. 2A. Locations i=0,1,2 ... M−2 are used for storing seed data. In other words, those memory locations of the memory segment 135 between addresses i=1 and i=M−1 other than location i=M−1 itself are used for storing seed data. Memory location i=M−1 (that is, location i=31 in this case) is used for storing the first check code, which as stated earlier, is a function of the seed data stored in the remainder of memory segment 135.

When a particular card 115 is plugged into backplane 108, processor 101 reads the seed data in memory locations i=0 through i=M−2 and thus retrieves that seed data. Also, when a card 115 is plugged into connector 110 of processor 101, processor 101 reads the first error check code in location i=M−1 and thus retrieves the first error check code therein.

After retrieving the seed data and the error check code as described above, processor 101 uses this same predetermined algorithm, which algorithm was previously stored in memory 104 of the processor, to operate on the seed data and to generate an error check code which is referred to as the second error check code. Processor 101 then compares the retrieved first error code retrieved from memory 125 with the just calculated second error check code. If processor 101 determines that the second error check code is the same as the retrieved first error check code, this signifies that the particular card 115 has been verified as being appropriate for processor 101 and processor 101 continues to operate and function with the card 115. That is, in this case, processor 101 continues to accept data from and send data and instructions to card 115 in the normal manner. However, if processor 101 determines that the second error check code is not the same as the retrieved first error check code, thus signifying that the particular card 115 is improper, then processor 115 ceases to operate in conjunction with the particular card 115. That is, in this instance, processor 101 ceases to accept and process information from card 115.

The above described apparatus and procedure verifies that the particular card 115 is a proper card which is appropriate for use with processor 101. Although for purposes of simplicity it has been stated that this verification occurs when the card is plugged into backplane 108, more specifically, such verification of the card will generally occur upon power-up of processor 101, that is, when the power to processor 101 is initially turned on after installation of card 115.

In this invention, any number of different algorithms may be selected as the above mentioned predetermined algorithm. What is important is that the error check code which is the output or result of the selected algorithm is a function of the seed data which is stored in memory 125 on card 115.

One such algorithm is now described for purposes of example. It is noted that the particular algorithm described below permits the calculating of error check codes in parallel over large amounts of seed data words in memory 125. Assuming the word length of the particular processor 101 is N (N=8 in this example) and that a cyclic redundancy code (CRC) polynomial is chosen which generates a code L bits long, then N CRC codes are calculated in parallel over a memory array which is N bits wide by M bits long, for example, as in the memory array or segment 135 depicted in FIG. 2A.

More particularly, to accomplish this, a circular file 140 which is L bits long and N bits wide is created as depicted in FIG. 2B. This L×N circular file 140 is initialized with a value of zero (0). Processor 101 generates a file pointer 145 which counts in base L. As mentioned earlier, another pointer denoted as memory pointer 130 is generated and kept by processor 101, such memory pointer 130 starting at i=0 and ending at i=M−1. Memory pointer 130 points into memory array 135 as seen in FIG. 2A. The value in memory array 135 pointed to by memory pointer 130 is placed into circular file 140 at the location pointed to by file pointer 145 and is exclusive OR'd at locations in circular file 140 pointed to by file pointer 145 with relative offsets determined by all the terms in the original CRC polynomial except $x^0$.

An example will now be given to illustrate the above point. If the CRC polynomial is selected to be $x^3+x^2+1$, then the value in memory array 135 pointed to by memory pointer 130 will be placed in the location in circular file 140 pointed to by file pointer 145 and exclusive OR'd to the locations pointed to by Modulo L (file pointer 145+2) and Modulo L (file pointer 145+3). After this is done, both memory pointer 130 and file pointer 145 are incremented, and the above described operation is repeated until memory pointer 130 reaches a value of i=M.

After completion of the above described operations, N CRC codes exist in circular file 140. Each of the N CRC codes in circular file 140 has been calculated over the N columns of memory array 135 and each of these N CRC codes carries the characteristics of the particular CRC polynomial employed to generate the N CRC codes.

As explained subsequently, the N CRC codes are now combined in such a manner as to generate one code which is N bits long. As a first step in generating one code which is N bits long, a zero vector of length N is generated. As will be described subsequently, a series of operations will be performed on this vector, the final result of which will be designated the final vector. After each of these operations the resultant vector will for convenience still be designated a vector, although the vector is changed according to each operation performed thereon.

To reiterate, first, a zero vector of length N is generated. The first entry in circular file 140 is exclusive OR'd into the zero vector to generate a resultant second vector. The second vector is then rotated left one bit to generate a third vector. The next (second) entry in circular file 140 is then exclusive OR'd into the third vector to generate a fourth vector. The fourth vector is rotated left one bit. The above described procedure is repeated continuing with the fourth vector until all entries in circular file 140 are exclusive OR'd into the vector thus generating a final vector.

The final vector thus generated represents the first error check code which is stored in card memory 125. It will now be seen that in this embodiment of the invention, the first error check code stored in memory location $i=M-1$ is the final vector which is a function of the data stored in the remaining memory locations $i=1,2 \ldots M-2$.

Thus, in this particular embodiment of the invention, processor 101 verifies that card 115 is a proper card by retrieving the seed data in memory locations $i=1,2 \ldots M-1$, checking the model number, vendor identifier, and card characteristics and performing the same algorithm operations just described on that seed data to generate a resultant final vector which is the second error check code. As already explained in detail earlier, if the determined second error check code matches the retrieved first error check code, and all the seed data matches what the system can accept then card 115 is permitted to operate in conjunction with processor 101. Otherwise, if the card is of unknown type or the determined second error check code fails to match the retrieved first error check code, the further operation of card 115 in conjunction with processor 101 is not permitted.

The cessation of further interaction of processor 101 with the inappropriate card 115 may be accomplished in several different ways. For example, the operating system software within processor system 101 disables communications with the particular system port connector 110 into which the inappropriate card 115 is plugged. Alternatively, when the processor system operating system recognizes that an inappropriate card is plugged into port connector 115, power to card 115 may be switched off or an enable line coupled to card 115 is set to a disable state. Whatever the particular manner selected, it is important that when card 115 is determined to be inappropriate, its operation in conjunction with processor system 101 is effectively discontinued.

FIG. 3 is a flowchart of a control software program stored in memory 104 within processor system 101 for execution to implement the present invention. Power-up of processor system 101 occurs at block 200 at which initialization of system 101 also occurs. The seed data on card 115 is then retrieved at block 205. The seed data is then compared with known acceptable data to determine if the board or card characteristics are acceptable to the processor system as per, block 206. If the characteristics, e.g., revision level, are not acceptable, the program jumps to block 230. If acceptable, the first error check code is retrieved at block 210. It will be recalled from the earlier discussion that the first error check code stored in memory 125 is a function of the seed data stored therein and that the first error check code is related to the seed data by a predetermined algorithm. The first error check code and the seed data were stored in card 115 at an earlier time. Processor system 101 determines a second error check code at block 215 by employing the same predetermined algorithm as above to operate on the retrieved seed data to generate the second error check. The determined second error check code is compared with the retrieved first error check code at block 220. If the determined second error check code is found to be the same as the retrieved first error check code, then as per block 225, system 101 is permitted to continue operation with card 115. However, if the second error check code is determined to be different than the retrieved first error check code, then as per block 230, card 115 is not permitted to continue functioning together with processor system 101. That is, communications between card 115 and processor system 115 are caused to cease until the next power-on of processor system 101 or other appropriate time.

An apparatus for verifying if a particular card is appropriate for operation in a selected processor system has been described in detail above, and a method for determining if a particular card is appropriate for operating with a selected processor system has also been described. Such method is summarized in the flowchart of FIG. 3 and the foregoing discussion. The present invention may be advantageously used to reduce the incidence of damage to electronic processor systems when inappropriate plug-in cards are inserted into such electronic processor systems. Also, the invention advantageously avoids the corruption of data within processor system 101 which may otherwise result if an improper plug-in card were connected to processor 101. In addition, the invention will also screen cards which do not match the check algorithm and may be counterfeit.

While only certain preferred features of the invention have been shown by way of illustration, many modifications and changes will occur to those skilled in the art. For example, other error check algorithms may be employed or the processor system 101 may use an algorithm complementary to (rather than the same as) the algorithm used to generate the error check code for the card so that a predetermined value is produced when the error check codes are compared. In another form, the algorithm used to generate the error check code on the card may be different than the system algorithm, but complementary in the sense that a predetermined value is generated by the system algorithm when the seed data is combined with the error check code on the card. It is, therefore, to be understood that the present claims are intended to cover all such modifications and changes which fall within the true spirit of the invention.

What is claimed is:

1. An information processing system comprising:
   an electronic circuit card including a memory for storing a first error check code and seed data, said first error check code being a function of the seed data stored on said card, said first error check code being related to said seed data by a predetermined algorithm; and
   an electronic processor capable of communicating with said card when said card is connected to said processor, said electronic processor including:
   retrieving means, for retrieving said first error check code and said seed data from said card, thus providing a retrieved first error check code and retrieved seed data;
   means for calculating a second error check code from said retrieved seed data using said predetermined algorithm;
   comparing means for comparing said second error check code with said retrieved first error check code; and
   means for permitting said electronic circuit card to function with said system if said comparing means produces a predetermined value upon comparing said second error code to said retrieved first error check code and otherwise not permitting said electronic circuit card to function with said system.

2. The information processing system of claim 1 wherein said comparing means produces said predetermined value when said second error check code is identical to said first error check code.

3. The information processing system of claim 1 and including means for comparing said seed data to preselected data stored in said processor and for disabling operation of said electronic circuit card if said seed data does not match said preselected data.

4. The information processing system of claim 3 wherein said seed data includes at least data representative of model number, vendor identifying number, and characteristics of said electronic circuit card.

5. The information processing system of claim 1 wherein said predetermined algorithm is of the form $x^3+x^2+1$.

6. The information processing system of claim 1 wherein said means for calculating a second error check code comprises a circular file L bits long and N bits wide, where L is the desired number of bits in the second error check code and N is the bits per word used in said system, said calculating means being operative to repetitively exclusive OR each entry in said file with an adjacent entry to produce a result, rotate said result by one bit and repeat the exclusive OR operation until all of the entries in the circular file are exclusive OR'd into the second error check code.

7. In an information processing system capable of accepting electronic circuit cards therein, a method of determining if a particular card is appropriate for use in said system, said method comprising the steps of:

storing a first error check code on said card, said first error check code being a function of seed data stored on said card, said first error check code being related to said seed data by a first predetermined algorithm;

retrieving said first error check code from said card and storing it in the system;

retrieving the seed data stored on said card and storing it in the system;

calculating a second error check code from said retrieved seed data using a second predetermined algorithm;

summing said second error check code with said retrieved first error check code; and permitting said card to function with said system if said step of summing produces a predetermined value and otherwise not permitting said card to function with said system.

8. The method of claim 7 and including the steps of:

storing in the system preselected values of acceptable seed data;

comparing the stored seed to the retrieved seed data; and disabling operation of the card if the stored seed data is outside the preselected values of acceptable seed data.

9. The method of claim 7 wherein said first and said second predetermined algorithms are identical, said step of summing comprising the step of comparing the first error check code with the second error check code for determining identity therebetween.

* * * * *